United States Patent [19]

Shajenko

[11] Patent Number: 4,998,225
[45] Date of Patent: Mar. 5, 1991

[54] DUAL BEAM DOPPLER SHIFT HYDROPHONE

[75] Inventor: Peter Shajenko, Storrs, Conn.

[73] Assignee: The United States of America as represented by the Secretary of the Navy, Washington, D.C.

[21] Appl. No.: 103,826

[22] Filed: Dec. 10, 1979

[51] Int. Cl.$^5$ ............................................. H04R 23/00
[52] U.S. Cl. ..................................... 367/140; 367/149; 350/96.1; 250/227.19
[58] Field of Search ............... 367/140, 141, 149, 174; 350/96.1, 163; 250/239, 227.19, 227.27; 356/345

[56] References Cited

U.S. PATENT DOCUMENTS 4,071,753  1/1978  Fulenwider et al. ............ 367/140 X
4,115,753  9/1978  Shajenko ........................ 367/149 X
4,162,397  7/1979  Bucaro et al. ................... 367/140 X Primary Examiner—Thomas H. Tarcza
Assistant Examiner—Daniel T. Pihulic
Attorney, Agent, or Firm—Michael J. McGowan; Prithvi C. Lall

[57] ABSTRACT

A dual beam hydrophone wherein a reference laser beam and a signal laser beam are both modulated simultaneosuly by the movement of reflecting surfaces responding to pressure variatrions due to an impinging acoustic wave. Each beam, travels the same path length within the hydrophone before being detected, thus eliminating any otherwise needed signal compensation. The reference beam and signal beam are acoustically modulated 180 degrees out of phase which reduces by one half the number of reflections normally required to produce the same sensitivity.

5 Claims, 1 Drawing Sheet

DUAL BEAM DOPPLER SHIFT HYDROPHONE

STATEMENT OF GOVERNMENT INTEREST
(U)

The invention described herein may be manufactured and used by or for the Government of the United States of America for governmental purposes without the payment of any royalties thereon or therefor.

BACKGROUND OF THE INVENTION

The present invention generally relates to a device for sensing acoustic signals and more particularly relates to a dual beam doppler shift hydrophone wherein pressure variations due to an acoustic wave impinging on a series of mirrors are changed into modulations of light which are transmitted by fiber optic guides.

A majority of the presently used hydrophones are piezo-electric transducers and their use imposes many difficulties. Each such hydrophone requires associated electronic circuitry which distributes power for its operation. There is also a limit as to the minimum of the size and weight of piezoelectric hydrophones. Thus, there is a need for a hydrophone that senses underwater sound with a light beam thereby not requiring telemetry electronics which are sensitive to electromagnetic interference and which can be smaller in size and simpler to operate.

An optically operated hydrophone previously used frequency modulation of a light beam in response to acoustic pressure variations utilizing the doppler effect. This was fully described in my U.S. Pat. No. 4,188,096. Whenever the relative distance between a source of light and a receiver is varying in time, the light received is shifted in frequency in proportion to the relative velocity of the two. A device which provides a change in optical path length with the acoustic pressure wave can thus be employed as a light modulator. The device may include two mirrors between which a light beam propagates through a series of reflections while the distance between the mirrors is varying with pressure variations. It can also be a light transparent block of rubber whose dimensions vary with acoustic pressure variations or simply an optical fiber made of glass or other compressible optical material which changes in length due to applied acoustic pressure variations. The signal thus imposed on the light beam is then demodulated using techniques of interferometry, where the frequency shift of the light beam is detected by comparing it with a second light beam as a reference beam on the surface of a photodetector. Frequency stability, intensity and polarization of both beams are important for proper demodulation and it is thus desirable that the light beams be derived from the same optical source which can be a laser. Furthermore, the path length of both the beams should be matched to be within the coherent length of a laser used. For best performance, both the beams should be exposed to the same environmental conditions in order to balance modulating effects caused by static pressure, strain, etc.

SUMMARY OF THE INVENTION

An acoustic detector built according to the teachings of subject invention is a dual beam doppler shift hydrophone wherein both optical beams are modulated by the acoustic pressure variations. When both light beams are exposed to nearly the same environmental conditions, the design of the dual beam optical hydrophone is such that both beams are modulated by the same pressure variations due to the incident acoustic wave but 180° out of phase with one another, i.e., when one of the beams see the maximum pressure the other beam sees the minimum pressure due to the acoustic wave.

An object of subject invention is to have an acoustic transducer having a simple construction and relatively high sensitivity.

Another object of subject invention is to have a dual beam doppler shift hydrophone wherein both beams are exposed to the same environmental conditions thus simplifying beam balancing.

A further object of subject invention is to have a hydrophone wherein both beams are exposed to the same acoustic pressure variation at the same time.

Still another object of subject invention is to have an optical hydrophone using optical fibers which simplifies interface problems.

Other objects, advantages and novel features of the invention will become apparent from the following detailed description of the invention when considered in conjunction with the accompanying drawings wherein:

DESCRIPTION OF THE PREFERRED EMBODIMENTS

Figure 1:
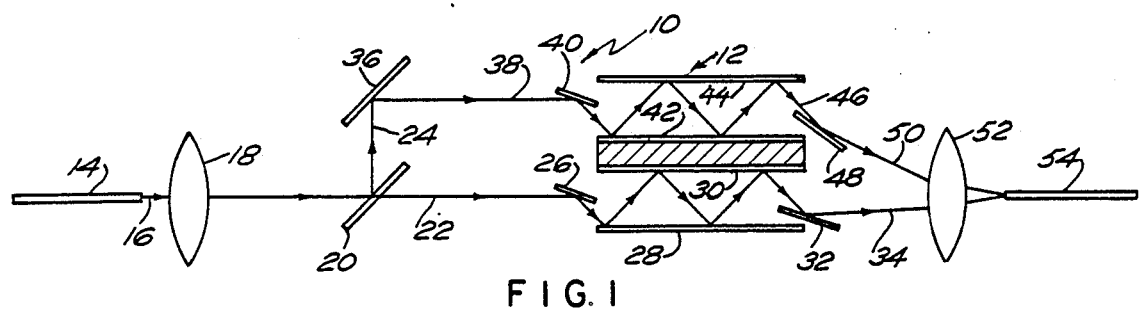
FIG. 1 is a schematic representation of a system using a dual beam hydrophone built according to the teachings of subject invention.

Referring to the drawings, FIG. 1 schematically shows a system 10 using a dual beam doppler shift hydrophone 12 built according to the teachings of subject invention. System 10 includes a transducer 12, an optical fiber 14 carrying a beam of light 16 which is collimated by a lens 18 so as to fall on a beam splitter 20. The beam splitter 20 gives two light beams 22 and 24. Beam 22 is reflected by mirror 26 so as to enter transducer 12, experiences multiple reflections between mirrors 28 and 30, and is finally reflected out of transducer 12 by means of mirror 32 so as to emerge as light beam 34. Beam 24 is reflected by mirror 36 and the reflected beam 38 is reflected again by mirror 40 so as to fall on mirror 42 in transducer 12. Beam 38 undergoes multiple reflections between mirrors 42 and 44 emerging as beam 46 which is reflected by mirror 48 so as to obtain beam 50. Beams 34 and 50 are focused by lens 52 and are carried by optical fiber 54. The frequency shift in light beams 34 and 50 is proportional to the velocity of mirrors 30 and 42 of transducer 12. This change in velocity of mirrors 30 and 42 is caused by their motion resulting from the pressure variations due to incident acoustic signals.

Figure 2:
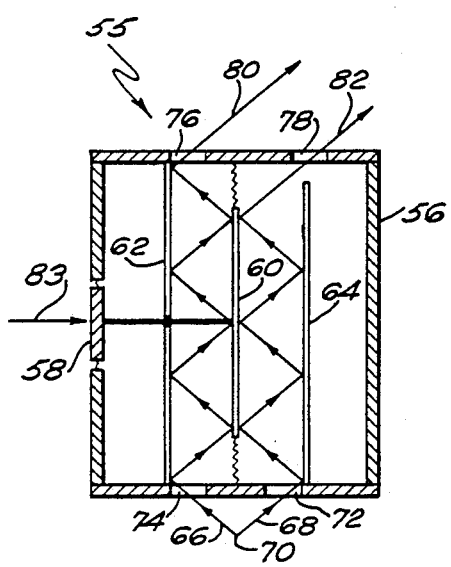
FIG. 2 is a schematic representation of one embodiment of a device built according to the teachings of subject invention.

FIG. 2 shows a transducer 55 built according to the teachings of subject invention. It includes a generally cylindrical enclosure, preferably made of a metallic piece having a suspended flexible disc 58 which is subjected to incident acoustic signals. Disc 58 is connected to the movably mounted mirror 60 through mirror 62.

Fixed mirrors 62 and 64 are housed inside cylindrical enclosure 56 of transducer 55. Laser beams 66 and 68, emanating from laser 70, pass into enclosure 56 through windows 74 and 72 respectively, undergo multiple reflections from mirrors 60, 62 and 64 and emerge through windows 76 and 78 as beams 80 and 82 respectively. An incident acoustic signal 83 impinging on disc 58 moves mirror 60 accordingly causing light beams 80 and 82 to be modulated proportionally. Thus, pressure variations due to impinging incident signal 83 produce frequency changes in laser beams 80 and 82 which are proportional to the pressure variations due the incident acoustic signal. When these light beams fall on a photodetector, they produce an electrical signal containing information about the acoustic wave.

Figure 3:
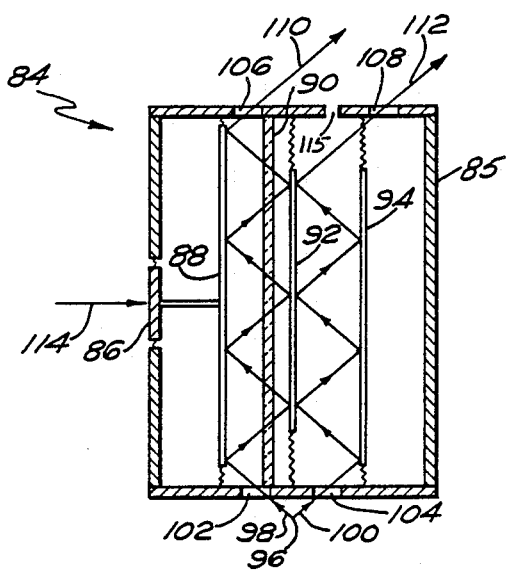
FIG. 3 is another embodiment of a dual beam hydrophone of subject invention.

FIG. 3 shows transducer 84 built according to the teachings of subject invention. Transducer 84 includes a generally cylindrical metallic box 85 having a flexible disc 86 forming a part of one of the walls. Disc 86 is connected to movable mounted mirror 88. The inside of cylindrical box 85 is partitioned by means of transparent plate 90. Two movably mounted mirrors 92 and 94 are installed inside the cylindrical box in the portion of box 85 which is opposite to the one where mirror 88 is housed. Laser 96 produces beams 98 and 100 which pass through windows 102 and 104 respectively, enter box 85, suffer multiple reflections at mirrors 88, 92 and 94 as shown in FIG. 3 and emerge out of windows 106 and 108 as laser beams 110 and 112 respectively. Laser beams 110 and 112 are focused on and transmitted via a fiber optic guide to a photodetector. Incident acoustic signal 114 moves disc 86 and consequently mirror 88 due to the pressure variations of acoustic signal 114. The same pressure variations are transmitted to the region containing mirrors 92 and 94 through opening 115 and cause relative motions thereof due to pressure variations from the incident acoustic signal. The modulation of laser beams 110 and 112 is dependent on the pressure variations of the acoustic signal and these beams can then be processed to extract information about the incident acoustic signal.

Figure 4:
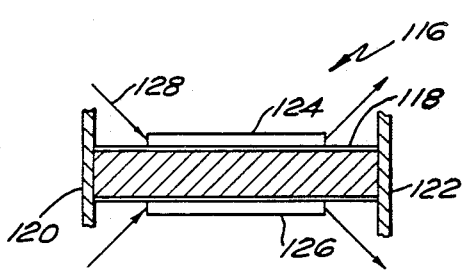
FIG. 4 is still another embodiment of subject invention.

FIG. 4 shows another embodiment of subject invention. Transducer 116 is shown in the form of a plate 118 supported by elements 120 and 122. Plate 118 is capable of vibrating. Fiber optic guide 124 is placed on one side of plate 118 and fiber optic guide 126 is placed on the opposite side of plate 118. Plate 118 vibrates because of pressure variations due to the incident acoustic signal. As a result, one side of plate 118 is elongated while the opposite side is contracted. Consequently, both light beams passing through fiber optic guides 124 and 126 are modulated out of phase by the same incident acoustic signal.

Figure 5:
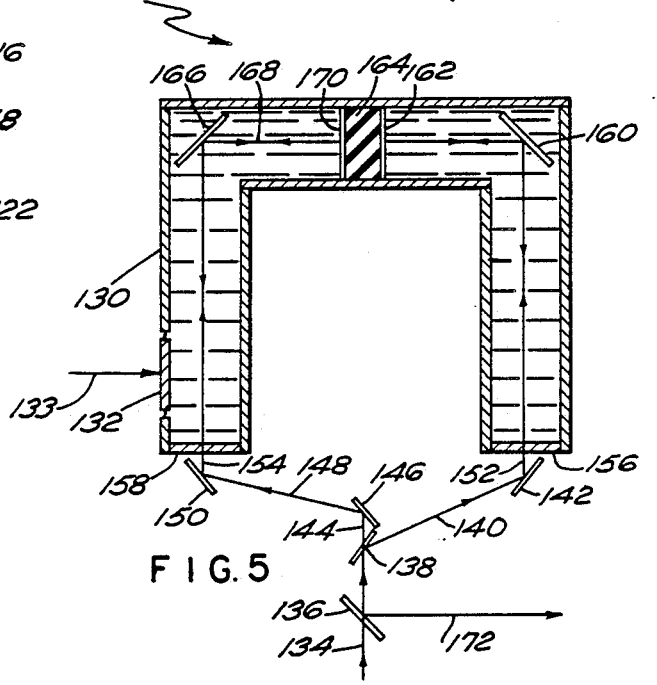
FIG. 5 is another variation of the device according to the teachings of subject invention.

Still another embodiment is shown in FIG. 5. Transducer 129 includes a U-shaped metallic tube 130 which has a movably mounted disc 132 on one wall thereof. Disc 132 transmits pressure fluctuations due to incident acoustic signal 133 into tube 130. Laser beam 134 passes through beam splitter 136. The transmitted beam passing through beam splitter 136 is incident on beam splitter 138. The reflected beam 140 falls on reflector 142. The transmitted portion 144 passing beam splitter 138 is reflected at mirror 146 to form laser beam 148. Beam 148 is reflected at mirror 150. Beams reflected by mirrors 142 and 150 emerge as beams 152 and 154 respectively and they enter the respective sections of U-tube 130 through respective transparent ends 156 and 158 of U-tube 130. Beam 152 is reflected by mirror 160 and then is in turn reflected by mirror 162 which is attached to rubber piece 164. Beam 154 is reflected by mirror 166 and the reflected beam 168 is reflected again at mirror 170 attached to the opposite side of rubber piece 164. U-tube 130 is filled with a liquid and the pressure variations due to the impinging acoustic signal are transmitted to the liquid through movably mounted disc 132. Beam 172 coming back is transmitted to a photodetector for processing to correlate the changes in frequency to the pressure variations caused by the incident acoustic signal.

Briefly stated, a dual beam hydrophone built according to the teachings of subject invention provides two laser beams which are subjected to the same environmental conditions. The design of the hydrophone is such that both laser beams are modulated by the same pressure variations due to the incident acoustic wave but are 180° out of phase with one another. The shifts in frequency of the two beams are measured and are then correlated to the incident acoustic signals.

Obviously, many modifications and variations of the present invention are possible in the light of the above teachings. As an example, the structure of the transducer can be changed as long as the both light beams are modulated in the opposite sense by the incident acoustic signals. It is therefore understood that within the scope of the appended claims the invention may be practiced otherwise than specifically described.

I claim:

1. A dual beam doppler shift hydrophone wherein a reference laser beam and a signal laser beam are simultaneously modulated in proportion to impinging acoustic pressure waves and undergo acoustic phase shifts such that said beams are 180° out of phase with each other, said hydrophone comprising:

a first fiber optic cable adapted to transmit a laser beam;

a collimating lens to focus said laser beam after exiting said first fiber optic cable;

beam splitting means to produce a signal beam and a reference beam from said focused laser beam;

first reflecting means for directing said signal beam and said reference beam along parallel paths;

transducer means wherein said signal beam and said reference beam are modulated 180° out of phase by the impinging acoustic pressure waves within generally parallel containments;

second reflecting means to redirect said signal beam and said reference beam;

a condensing lens to focus and combine said signal beam and said reference beam into a single modulated beam; and a second fiber optic cable to transmit said modulated beam for further processing.

2. The dual beam doppler shift hydrophone of claim 1 wherein said transducer means further comprises:

a cylindrical box having a disc movably mounted on one side thereof and having transparent windows at the top and bottom thereof through which said laser beams may pass;

a first mirror fixedly mounted within said box;

a second mirror fixedly mounted inside said box, said second mirror being generally parallel to said first mirror;

a third mirror movably mounted inside said box, said third mirror being generally parallel to said first mirror and said second mirror and interposed between said first mirror and said second mirror; and means for connecting said movable disc to said movable third mirror.

3. The dual beam doppler shift hydrophone of claim 1 wherein said transducer means further comprises:
   a cylindrical box, the interior of which is separated into a first chamber and a second chamber by a transparent plate, fixedly mounted parallel to the major cylindrical axis thereof, having a disc movably mounted on the side of said first chamber, having an aperture open to said acoustic pressure waves on the top of said second chamber and having transparent windows at the top and bottom of both chambers thereof through which said laser beams may pass;
   a first mirror movably mounted within said first chamber;
   means for connecting said movable disc to said movable first mirror;
   a second mirror movably mounted inside said second chamber, said second mirror being generally parallel to said first mirror; and
   a third mirror movably mounted inside said second chamber said third mirror being generally parallel to said first mirror and said second mirror.

4. The dual beam doppler shift hydrophone of claim 1 wherein said transducer means further comprises:
   a flexible plate exposed to the impinging acoustic pressure waves and which vibrates therewith; and
   fiber optic guides attached to each side of said flexible plate and moving conformally therewith through which said laser beams pass and are modulated thereby.

5. The dual beam doppler shift hydrophone of claim 1, wherein said transducer means further comprises:
   a generally U-shaped tube having a movable mounted disc in the side of one arm thereof;
   a movable reflecting means located within said U-shaped tube which oscillates in response to said pressure variations transmitted thereto in response to movement of said movably mounted disc, having a rigid plate with mirrors attached back to back thereon; and
   stationary mirrors located within said U-shaped tube for guiding both an incident and reflected beam through said U-shaped tube to said movable reflecting means and back.

* * * * *